United States Patent
Reynolds et al.

(10) Patent No.: US 11,625,140 B2
(45) Date of Patent: Apr. 11, 2023

(54) CONFIGURING REMOTE DEVICES THROUGH VOLUMETRIC VIDEO TELEPRESENCE INTERFACES

(71) Applicant: PTC INC., Boston, MA (US)

(72) Inventors: Benjamin Reynolds, Cambridge, MA (US); Valentin Heun, Cambridge, MA (US); James Keat Hobin, Cambridge, MA (US); Hisham Bedri, Newton, MA (US)

( * ) Notice: Subject to any disclaimer, the term of this patent is extended or adjusted under 35 U.S.C. 154(b) by 314 days.

(21) Appl. No.: 16/889,595

(22) Filed: Jun. 1, 2020

(65) Prior Publication Data

US 2020/0379627 A1    Dec. 3, 2020

Related U.S. Application Data

(60) Provisional application No. 62/855,916, filed on May 31, 2019.

(51) Int. Cl.
   *G06F 3/04815*    (2022.01)
   *G06T 19/00*      (2011.01)
   *G06F 3/04847*    (2022.01)

(52) U.S. Cl.
   CPC ...... *G06F 3/04815* (2013.01); *G06F 3/04847* (2013.01); *G06T 19/006* (2013.01); *G06T 2200/24* (2013.01)

(58) Field of Classification Search
   CPC ............. G06F 3/04815; G06F 3/04847; G06T 19/006; G06T 2200/24
   USPC ........................................................ 715/735
   See application file for complete search history.

(56) References Cited

U.S. PATENT DOCUMENTS

| | | | |
|---|---|---|---|
| 2016/0170603 A1* | 6/2016 | Bastien | H04N 13/254 348/49 |
| 2017/0053446 A1* | 2/2017 | Chen | G06T 19/006 |
| 2017/0053447 A1* | 2/2017 | Chen | G06T 19/006 |
| 2018/0046352 A1* | 2/2018 | Johnson | G06F 3/04812 |

(Continued)

OTHER PUBLICATIONS

Cutler, Ben, et al., "Holoportation", URL: https://www.microsoft.com/en-us/research/project/holoportation-3/, accessed on Aug. 25, 2020, 5 Pages.

(Continued)

*Primary Examiner* — William D Titcomb
(74) *Attorney, Agent, or Firm* — Patent GC LLC; Alexander Franco

(57) ABSTRACT

A configuration system uses multiple depth cameras to create a volumetric capture space around an electronically controllable industrial machine or system, referred to as a target system. The output of the cameras is processed to create a live 3D model of everything within the space. A remote operator can then navigate within this 3D model, for example from a desktop application, in order to view the target system from various perspectives in a live 3D telepresence. In addition to the live 3D model, a configuration system generates a 3D user interface for programming and configuring machines or target systems within the space in a spatially coherent way. Local operators can interact with the target system using mobile phones which track the target system in augmented reality. Any number of local operators can interact with a remote operator to simultaneously program and configure the target system.

20 Claims, 27 Drawing Sheets
(26 of 27 Drawing Sheet(s) Filed in Color)

(56) References Cited

U.S. PATENT DOCUMENTS

| | | | | |
|---|---|---|---|---|
| 2020/0012415 | A1* | 1/2020 | Miller | G06F 3/0485 |
| 2020/0074733 | A1* | 3/2020 | Oliver | G06F 3/1292 |
| 2020/0368616 | A1* | 11/2020 | Delamont | A63F 13/213 |

OTHER PUBLICATIONS

Heun, et al., "Reality Editor: Programming Smarter Objects,", In Proceedings of the 2013 ACM Conference on Pervasive and Ubiquitous Computing Adjunct Publication (UbiComp'13), Sep. 8-12, 2013, 307-310 Pages.

Heun, Valentin Markus Josef, "Smarter Objects: Programming Physical Objects with AR Technology", Program in Media Arts and Sciences, School of Architecture and Planning, Partial fulfillment of the requirements of the degree of Master of Science in Media Arts and Sciences, MIT, Sep. 2013, 122 pages.

Heun, Valentin, "The Reality Editor: An Open and Universal Tool for Understanding and Controlling the Physical World", Program in Media Arts and Sciences, School of Architecture and Planning, Partial fulfillment of the requirements for the degree of Doctor of Philosophy in Media Arts and Sciences, MIT, Sep. 2017, 199 pages.

Hobin, James Keat, "Editing Reality Made Easy", Department of Electrical Engineering and Computer Science, Partial Fulfillment of the Requirements for the Degree of Master of Engineering in Electrical Engineering and Computer Science, MIT, Jun. 2017, 45 pages.

Jaunt XR, "Real Time Volumetric AR Capture from Jaunt", URL: https://www.facebook.com/within/videos/328541961228533/, accessed on Aug. 25, 2020, 2 Pages.

Maimone, Andrew, et al., "Encumbrance-free telepresence system with real-time 3D capture and display using commodity depth cameras", 10th IEEE International Symposium on Mixed and Augmented Reality, IEEE, Oct. 26-29, 2011, 10 Pages.

Orts-Escolano, Sergio, et al., "Holoportation: Virtual 3d Teleportation in Real-Time", Proceedings of the 29th Annual Symposium on User Interface Software and Technology. ACM, Oct. 16-19, 2016, 14 Pages.

Reynolds, Benjamin, "An Augmented Reality Editor: Building data-focused tools to extend the capability, connectivity, and usability of a mobile Internet of Things browser", Department of Electrical Engineering and Computer Science, Partial Fulfillment of the Requirements for the Degree of Master of Engineering in Electrical Engineering and Computer Science, MIT, May 2017, 111 pages.

Rosenberg, Louis B., et al., "The Use of Virtual Fixtures to Enhance Operator Performance in Time Delayed Teleoperation", DTIC Document, Mar. 1993, 55 Pages.

* cited by examiner

CONFIGURING REMOTE DEVICES THROUGH VOLUMETRIC VIDEO TELEPRESENCE INTERFACES

RELATED APPLICATIONS

The subject matter of this application is related to U.S. Provisional Application No. 62/855,916, filed on 2019 May 31, which is hereby incorporated by reference in its entirety.

BACKGROUND OF THE INVENTION

The present disclosure leverages and builds upon a project named "Reality Editor" that was active at the MIT Media Lab at the Massachusetts Institute of Technology (MIT) from January 2014 to June 2017. The project has been extensively described and documented in four published MIT thesis papers as follows.

The first thesis paper, by Valentin Heun, is titled "Smarter objects: programming physical objects with AR technology", issued in 2013 by Massachusetts Institute of Technology Department of Architecture, Program in Media Arts and Sciences, and can be accessed at the http URL: hdl.handle.net/1721.1/91844. The Abstract of the thesis follows. This thesis describes a system that associates a virtual object with each physical object. These objects are connected to support a flexible and easy means of modifying the interface and behavior of a physical object. It also supports the creation of simple interactions with other "smarter" objects to create more complex functionality. As a user interacts with a physical object, an augmented reality interface visualizes the virtual object on top of the physical object and gives the user an intuitive graphical interface for modifying the object's interface and behavior or defining how it relates to other objects. As such, the system provides an innovative interface for programming the behavior of physical objects. The contribution of the thesis lies in the meaningful separation of physical and virtual object interactions, a concept of direct mapping and the interprogrammability of Smarter Objects. The thesis presents the employment of Smarter Objects from all aspects and discusses a working implementation as well as several usage scenarios demonstrating potential applications. Finally, the thesis reflects on the implications of this approach for industrial design.

The second thesis paper, by Valentin Heun, is titled "The reality editor: an open and universal tool for understanding and controlling the physical world", issued in 2017 by Massachusetts Institute of Technology Department of Architecture Program in Media Arts and Sciences, and can be accessed at the http URL: hdl.handle.net/1721.1/114072. The Abstract of the thesis follows. In a future where every physical object has the ability to compute and connect with other physical things, we have to rethink our present user interfaces and interaction metaphors. The desktop metaphor used in personal computers and smartphones was invented for data organization and is not well suited for interaction with things in the physical world. As a result, the growing number of interconnected things (or Internet of Things devices) surrounding us are becoming hard to operate. Each IoT device requires a different app to control it and forces the user to memorize a unique connection and interface. In addition, connected things made by different companies cannot easily be connected to one another. This thesis introduces a novel, directly mapped user interface for connected things built upon World Wide Web technology, a decentralized networking infrastructure for connected things to talk to each other, and a simple, visual user interface for understanding and controlling the connected things around us. The overall system is called the Reality Editor, an open-source, freely and publicly available tool for creating ecosystems of interconnected things. The thesis discusses the design of the Reality Editor, its core ideas and implementation details and a series of real world prototypes that were built to evaluate and improve the tool.

The third thesis paper, by Benjamin Reynolds, is titled "An augmented Reality Editor: building data-focused tools to extend the capability, connectivity, and usability of a mobile Internet of Things browser", issued in 2017 by Massachusetts Institute of Technology Department of Electrical Engineering and Computer Science, and can be accessed at the http URL: hdl.handle.net/1721.1/113172. The Abstract of the thesis follows. This thesis describes extensions made to the Reality Editor system to improve its ability to browse augmented reality content and to customize the flow of data between Internet of Things objects. The augmented reality browsing is improved by a platform shift to web technologies, while the data customization is provided by the design of logical operators that can be added to a network of objects. The contribution lies in the implementation of a novel grid-constrained, data flow visual programming language called Logic Crafting, which provides a modularized and extensible environment for manipulating the data passed between IoT objects. Associated contributions involve web service modules that allow non-developers to connect IoT objects with arbitrary remote services, and an implemented mechanism for changing the permissions model for IoT objects on a per-resource level. The thesis then presents a number of prototypes enabled by using web technologies for augmented reality, as well as demonstrative use cases for programming IoT objects with Logic Crafting. Finally, the thesis reflects on the implication of these features and prototypes on the subject of augmented multiuser environments.

The fourth thesis paper, by James Hobin, is titled "Editing reality made easy", issued in 2017 by Massachusetts Institute of Technology Department of Electrical Engineering and Computer Science, and can be accessed at the http URL: hdl.handle.net/1721.1/113151. The Abstract of the thesis follows. The Reality Editor is a system based around the concept that physical objects may serve augmented reality web interfaces while communicating information about their state to the local environment. Its combination of an augmented reality web browser with an object messaging system leads to high usability and simplicity. In my contribution to the project, I reduce the difficulty of creating and controlling compelling augmented reality Internet of Things experiences using the Reality Editor. I simplify the creation process through three areas of work: creating reusable user interface components, designing an in-browser editor, and implementing a drag-and-drop in-app editor. My work on enhancing control takes two forms: developing an object memory system and integrating networked cameras. Finally, I improve the Reality Editor as a whole through a series of efforts targeting its documentation, performance, and reliability.

The Reality Editor MIT Media Lab project can be accessed at the http URL: realityeditor.org. Open source software and source code for the project is available and accessible by the public.

SUMMARY OF THE INVENTION

A configuration system uses multiple depth cameras to create a volumetric capture space around an electronically controllable industrial machine or system, hereinafter referred to as a target system. The output of the cameras is processed to create a live 3D model of everything within the space. A remote operator can then navigate within this 3D model, for example from a desktop application, in order to view the target system from various perspectives in a live 3D telepresence. In addition to a live 3D model, the configuration system can generate a 3D user interface through which the remote operator can program, configure or interact with the target system. The programming interface can be implemented, for example, using the Reality Editor framework. Live 3D telepresence in conjunction with the 3D user interface enable the remote operator to interact with a remotely located target system in a spatially coherent way.

Multiple cameras trained on a location are used to create a volumetric capture space which creates a live 3D model of everything within the space. A remote operator can then view and navigate position and orientation within this space in 3D from a desktop application. In addition to the live 3D model, a configuration system generates a 3D user interface for programming and configuring machines or target systems within the space in a spatially coherent way. Local operators can interact with the target system using mobile phones which track the target system in augmented reality. Any number of local operators can interact with a remote operator to simultaneously program and configure the target system.

Programming a target system usually requires an operator to be next to the target system. Often this programming is done with a highly trained specialist that implements ladder-logic/code in a written format. The Reality Editor uses a 3D intuitive visual interface to allow any operator to be able to configure the target system. The 3D intuitive user interface works for those in physical proximity to the target system through a mobile device, however extending this to a remote operator is difficult because they do not have a 3D spatial view of the target system (or so-called perspective freedom).

A 3D depth camera can generate a live 3D model for everything within its view, but this is limited because certain objects can easily occlude other objects. The disclosed configuration system can produce a more complete live 3D model and reduce occlusion by aligning and calibrating multiple 3D cameras in the same space to create a live volumetric capture system.

The configuration system can enable a remote operator to program a target system in a three-dimensional and visual way while still seeing a live view of the target system. The configuration system can provide both a live volumetric capture space and a 3D visual programming feature. The volumetric capture space can be generated by a number of 3D depth cameras placed around the space and directed at the target system. When the cameras are calibrated and aligned, a model of this 3D space can be generated and updated in real time, and a view of the model can then be selected by and transmitted to a remote operator for display.

A three-dimensional visual programming interface can be attached to the target system via the Reality Editor tool. An aligned version for this 3D programming interface can be loaded on top of the dynamic view of the volumetric capture space as viewed by the remote operator. The remote operator is then able to navigate in three dimensions and three orientations around the space (a six dimensional pose) and program the target system visually while still inspecting the live results of the programming effort.

The inventors believe that this is the first remote 3D visual programming tool for an industrial machine. Remote programming was done previously in a black box with no way of viewing the result. Furthermore, it was done in a way that was not visual or user friendly.

The volumetric capture space is able to transmit only the dynamically generated necessary view of the space, instead of transmitting all the 3D information regarding the space. This reduces the bandwidth requirements necessary to perform 3D tele-operation. In addition, the configuration system can enable multiple users to configure and program a machine at once, with any change to the system becoming visible to all users simultaneously. In one embodiment, the configuration system uses Vuforia for model tracking and the Reality Editor for programming the machine

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
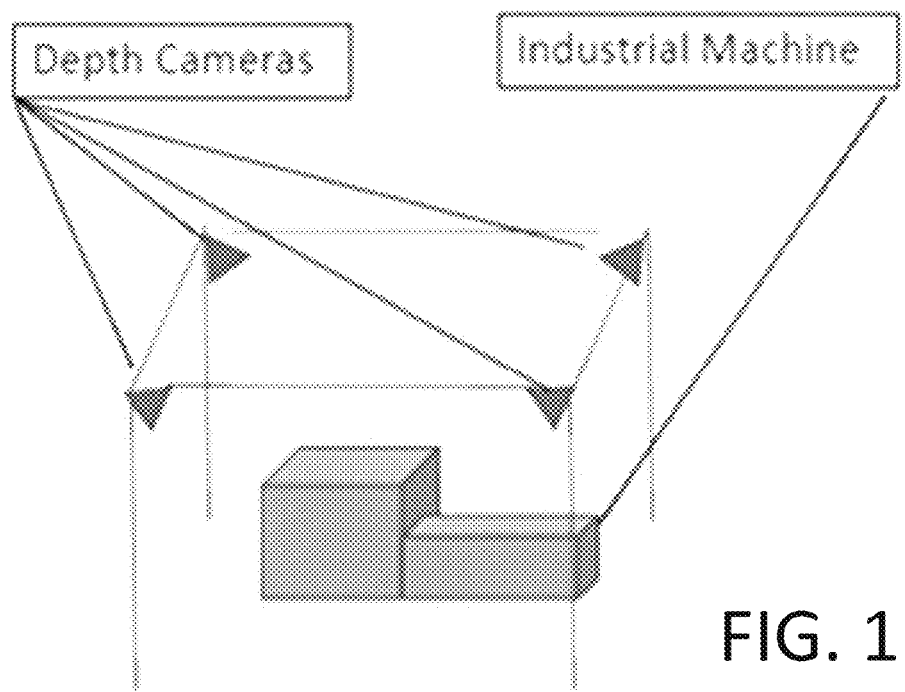
FIG. 1 illustrates a schematic of a volumetric capture space.

In the following description, references are made to various embodiments in accordance with which the disclosed subject matter can be practiced. Some embodiments may be described using the expressions one/an/another embodiment or the like, multiple instances of which do not necessarily refer to the same embodiment. Particular features, structures or characteristics associated with such instances can be combined in any suitable manner in various embodiments unless otherwise noted.

Programming an electronically controllable industrial machine or system, hereinafter referred to as a target system, is usually performed by a specialized programmer working in the physical presence of the target system. Often this programming is done by a highly trained specialist who implements ladder-logic or explicitly written code. While programs can be deployed onto target systems remotely, it can be dangerous for a programmer to make changes to an industrial target system without being able to visually verify the effects of the programming. Waiting for programmers to make changes to target systems in person can lead to increases in down-time at a factory. Certain changes to a target system may be minor, such as changing the quantity of a product produced. Such minimal changes, however, may still require a specialized programmer due to the complex nature of certain programming interfaces.

In person programming of target systems has been made easier using the Reality Editor, which uses augmented reality to create a drag and drop programming environment. While the Reality Editor supports several in-person operators collaborating, it does not support use from remote locations not having a direct view of the target system.

In accordance with certain embodiments, a configuration system uses multiple depth cameras to create a volumetric capture space around a programmable industrial target system. The output of the cameras is processed to create a live 3D model of everything within the space. A remote operator can then navigate within this 3D model, for example from a desktop application, in order to view the target system from various perspectives in a live 3D telepresence. In addition to a live 3D model, the configuration system can generate a 3D user interface through which the remote operator can program, configure or interact with the target system. The programming interface can be implemented, for example, using the Reality Editor framework. Live 3D telepresence in conjunction with the 3D user interface enable the remote operator to interact with a remotely located target system in a spatially coherent way.

In certain embodiments, a single moveable camera in the presence of the target system, the position of which can be remotely controlled (e.g. mounted on a moveable robot), may be able to provide different poses (locations and perspectives) to the remote operator of the volumetric space. A single stationary camera implementation can provide a remote operator a flat perspective view of the capture space, but a single stationary camera implementation may not enable the remote operator to navigate at will within the volumetric space so as to be able to see and interact with the target system from various poses.

Local operators can simultaneously interact with the target system, for example, using known local tools, such as the Reality Editor operating on a mobile phone to track the target system in augmented reality. Any number of remote and/or local operators can interact and simultaneously program and configure the target system.

FIG. 1 illustrates a schematic of a volumetric capture space where four depth cameras are trained on a space containing an industrial target system. There can be more or fewer depth cameras, depending on the needs of the particular implementation. The depth cameras can be connected to a local computer which acts as a virtualizer. The local computer collates live video (e.g. RGB) and depth streams from the cameras and places their corresponding point-clouds in the correct space. The local computer then renders a view of this point-cloud and transmits it to a remote computer of a remote operator. The remote computer then renders for the remote user this point-cloud and all the spatial user interfaces that the in-person user sees.

Figure 2:
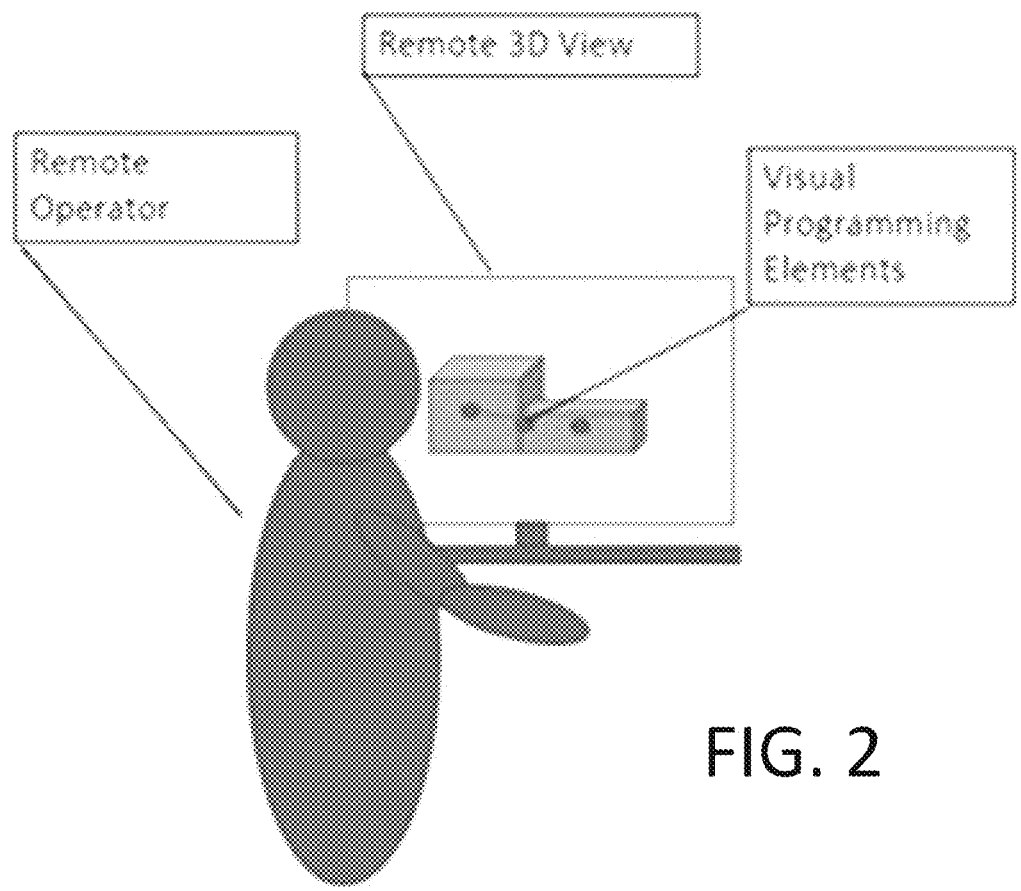
FIG. 2 illustrates a remote operator interacting with an interface.

FIG. 2 illustrates a remote operator interacting with an interface to manipulate visual programming elements of the remotely located industrial target system. The remote operator can view and interact with the target system and its visual programming elements, such as those supported by the Reality Editor, through various mechanisms. For example, the remote operator can use a traditional 2D display along with a traditional mouse, optionally augmented with a 3D mouse in order to control the pose of the view into the volumetric space. The remote operator can alternatively use a virtual reality headset in order to move within and interact with the target system. Using a programming interface, such as the Reality Editor, the remote operator can both control his perspective view of the volumetric space and with the context of that view, add, subtract, move, and change elements to control the programmable industrial target system.

The configuration system can use depth cameras to provide video and depth feeds in order to support a telepresence view by the remote operator into the volumetric space. To calibrate the cameras, the video and depth feeds of the cameras can be registered in association with intrinsic parameters for the cameras, which can be derived from their specifications. The extrinsic parameters for each camera can found by detecting a calibration target. Solving for the extrinsic parameters of the depth cameras enables the configuration system to render the captured point-clouds in world-space. In one embodiment, the color and depth feeds are rendered using a point-cloud shader in a Unity platform game engine system.

Figure 3:
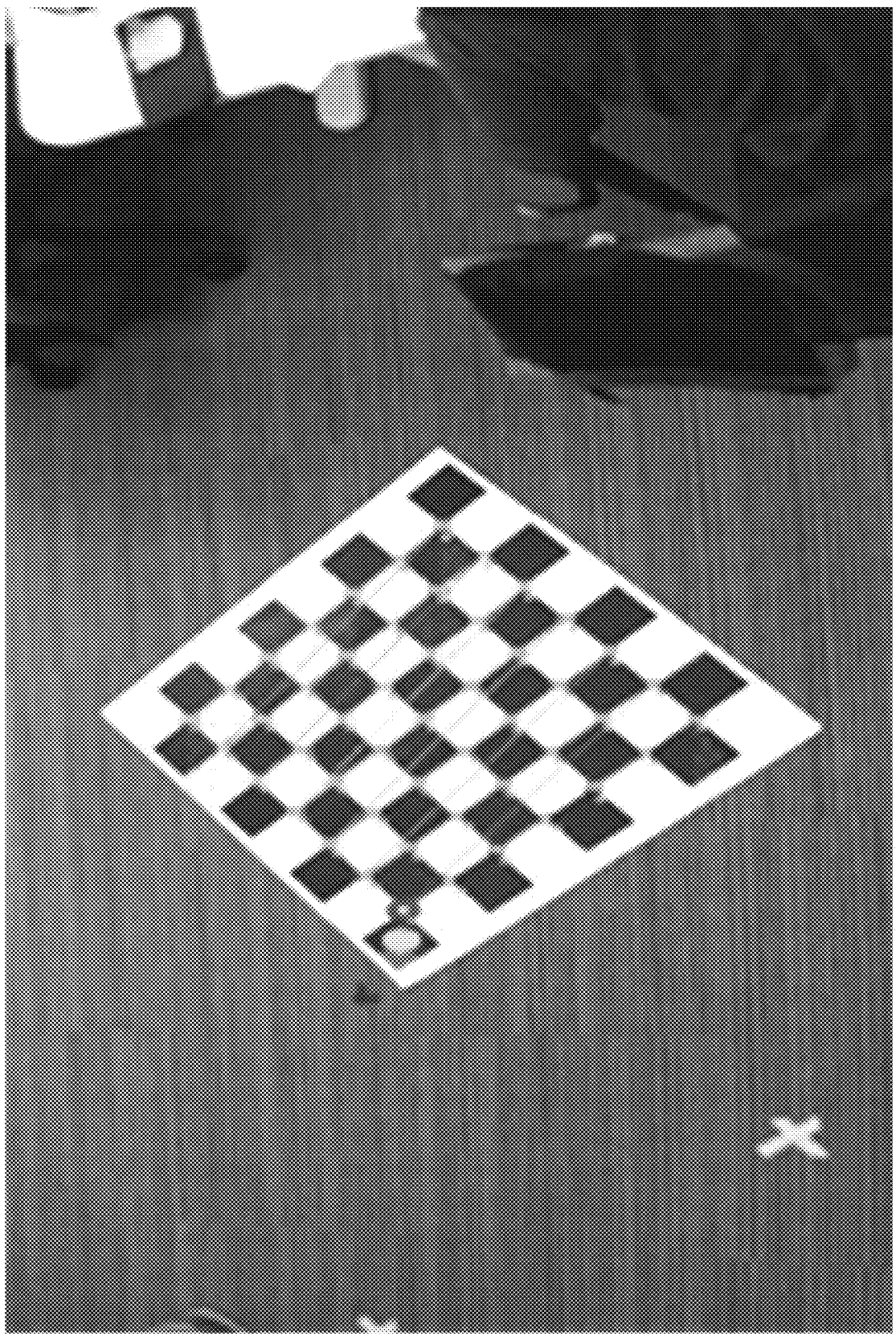
FIG. 3 illustrates a view from a video feed of a depth camera pointing at a calibration target.

FIG. 3 illustrates a view from a video feed of a depth camera pointing at a calibration target with the calibration results overlaid on top. The calibration target can be, for example, a 0.5 meter chessboard with a red mark added to identify the orientation of the 49 inner chess-board points.

Figure 4:
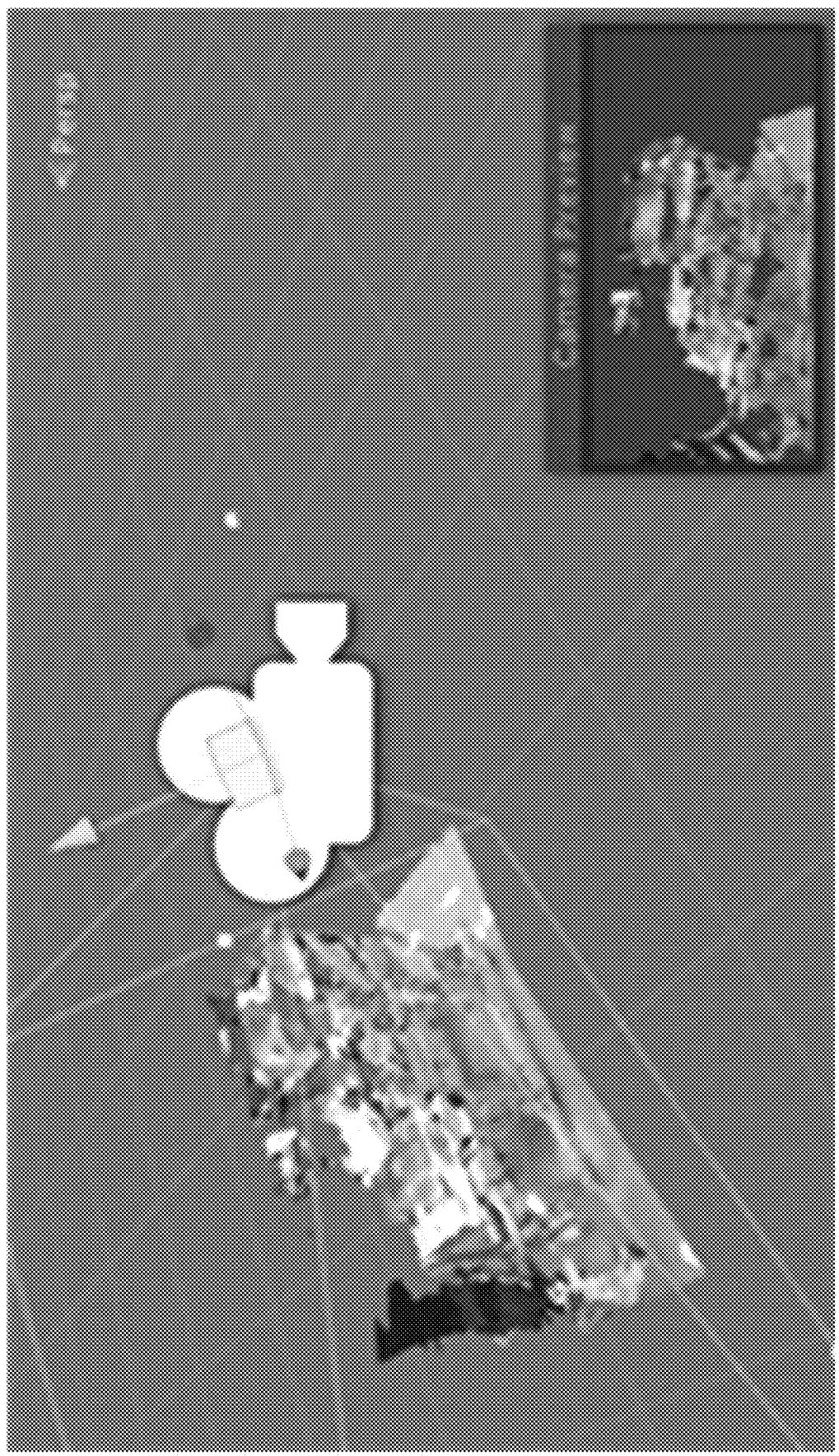
FIG. 4 illustrates a volumetric view of two registered depth cameras pointed at an industrial target system.

FIG. 4 illustrates a volumetric view of two registered depth cameras pointed at an industrial target system. A virtual camera is shown floating above the target system, and the floating camera's position can be controlled by the remote operator.

In a two camera implementation, the data-rate of two Intel Realsense D415 cameras is 55 million points per second (221 Megabytes/second). Transmitting this much data to a remote desktop can be cumbersome. In order to mitigate this, instead of transmitting the full point-cloud to the remote user, the configuration system can transmit a rendered view into this point cloud. The 3D position of this rendered view can be controlled by the remote operator. This reduces the amount of data transmitted to 1.65 megabytes per second.

Figure 5:
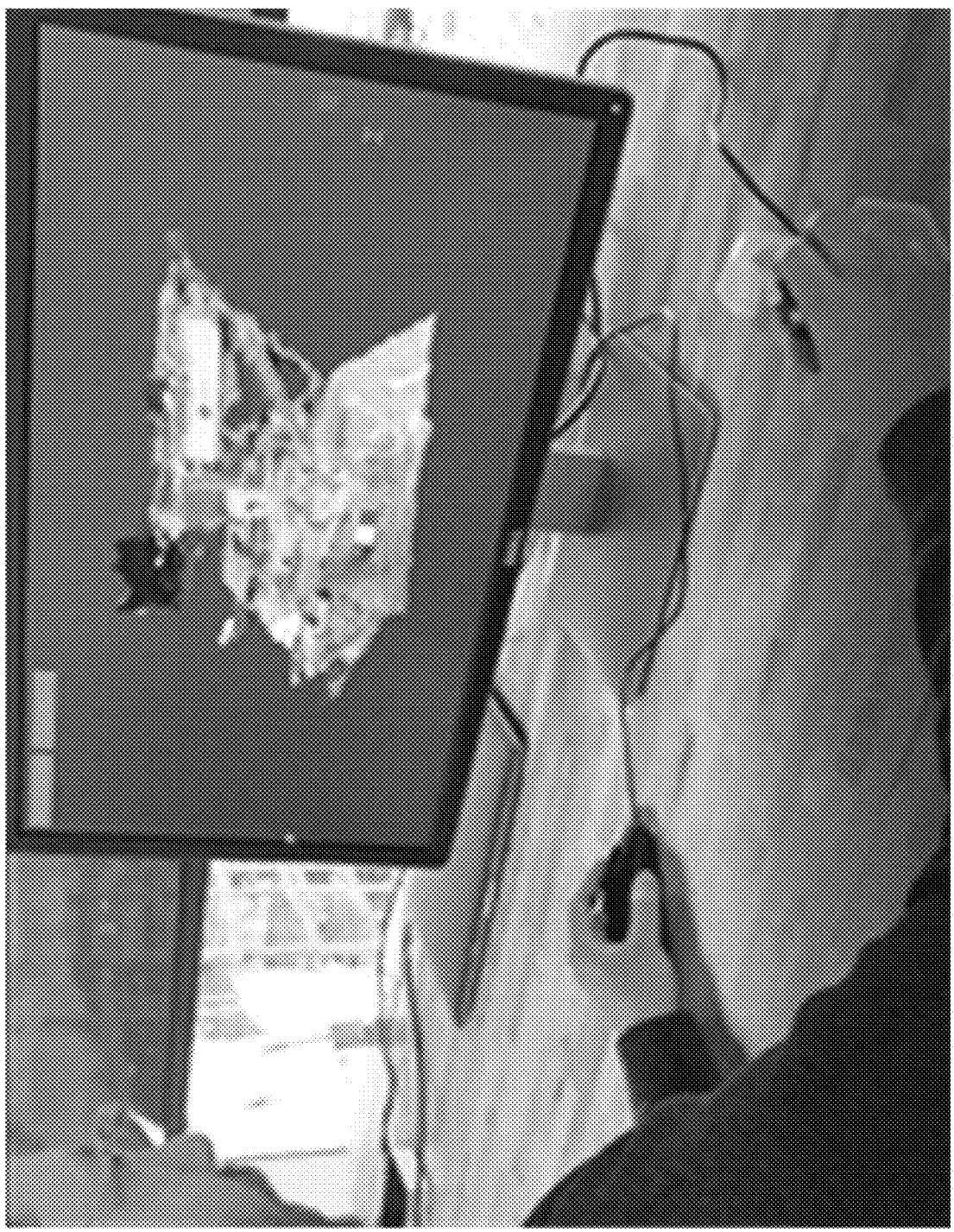
FIG. 5 is a photograph of a remote operator using the configuration system to view and interact with a target system.
Figure 6:
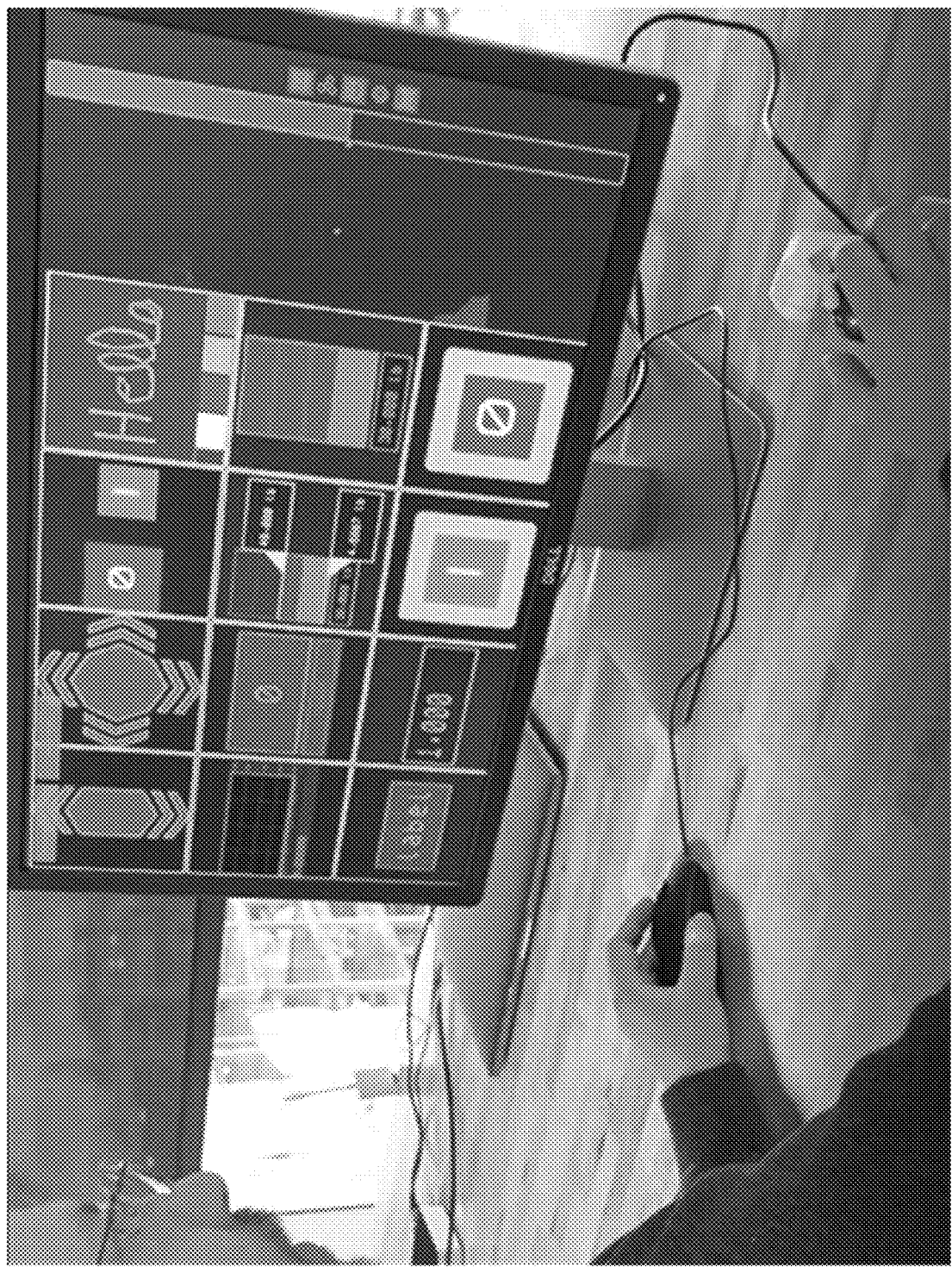
FIG. 6 is a photograph of the remote operator using the Reality Editor within the configuration system to add interfaces to the target system.

FIG. 5 is a photograph of a remote operator using the configuration system to view and interact with a target system. FIG. 6 is a photograph of the remote operator using the Reality Editor within the configuration system to add interfaces to the target system. As shown, the remote operator can control the view or pose into the volumetric space using a 3D mouse in one hand. The remote operator can use a 2D mouse in another hand to make modifications through the Reality Editor programming interface.

Figure 7:
FIG. 7 is a screenshot of a remote operator's display view that shows the Reality Editor display interface, overlaid on a remote operator's telepresence view.

FIG. 7 is a screenshot of a remote operator's display view that shows the Reality Editor display interface, overlaid on a remote operator's telepresence view. The overlay view enables the remote operator not only to view the status and configuration of the target system, but to add, move, delete, and connect inputs and/or outputs in a spatial way. These inputs and/or outputs can be digital or physical, enabling the system to be highly extensible. The remote operator can therefore program the target system in a visual drag and drop interface. This can enable an operator, for example, to change the value of a limiter, connect multiple target systems together so they trigger each other, or debug individual sensors and actuators on a target system.

Figure 8:
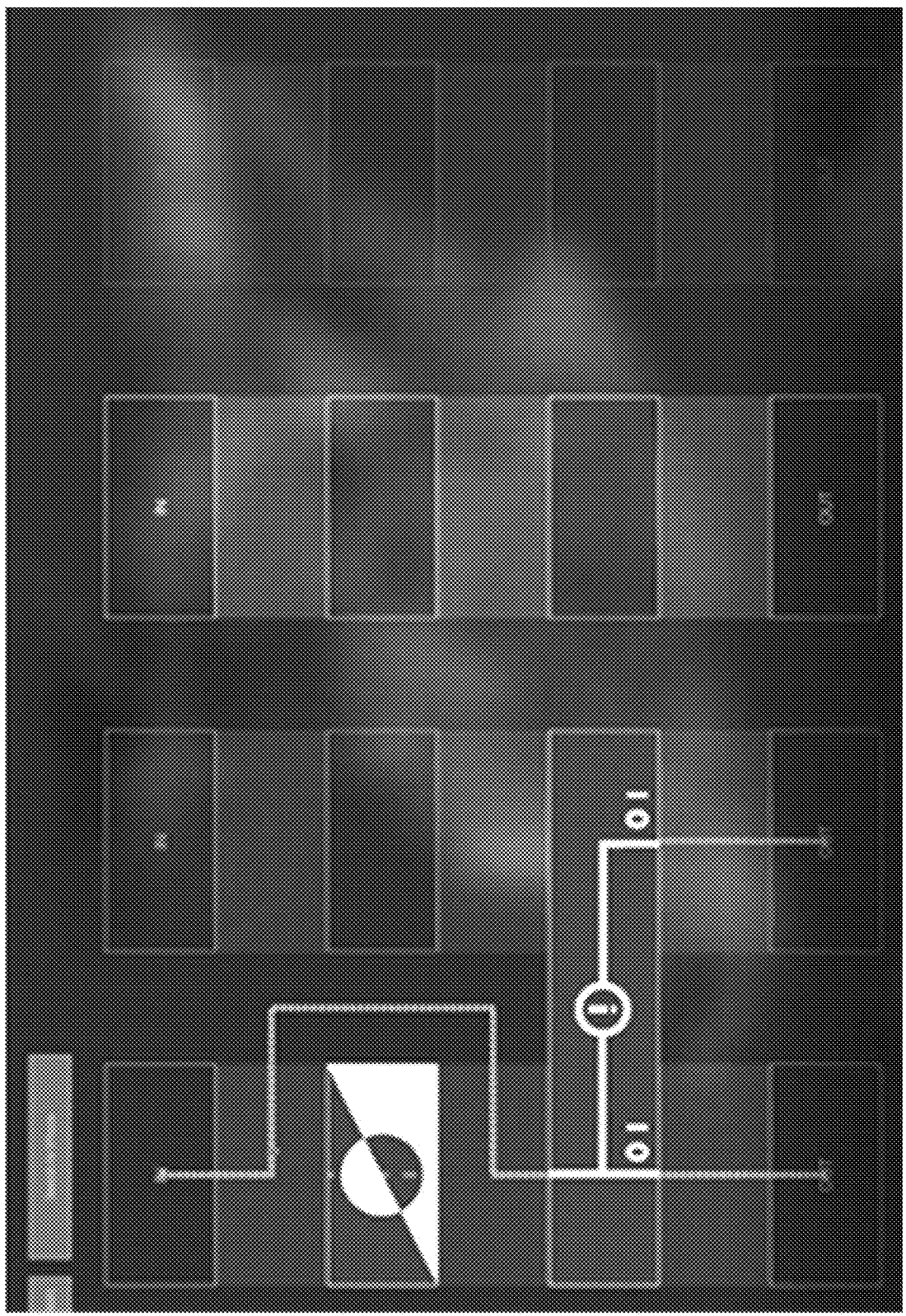
FIG. 8 is a screenshot of the remote operator's display view showing a user interface of the Reality Editor being used to configure of a target system's logic.

FIG. 8 is a screenshot of the remote operator's display view showing a user interface of the Reality Editor being used to configure a target system's logic. Details of the specific user interfaces provided by the Reality Editor and their use are available through the Reality Editor project website and the references in the Background section of this disclosure.

The Reality Editor enables multiple remote and/or local users to simultaneously view and interact with a target system. When multiple operators are operating on the same target system, they share view the configuration of the target system through their respective user interfaces. The remote user will view the system through the remote interface with Reality Editor features overlaid over a telepresence view. The local operator will use the augmented reality interface provided by the Reality Editor, such as through a mobile phone or tablet, to view the same Reality Editor features and tools in real time. Accordingly, the remote and local users can each interact with the target system and view its configuration in real-time. In addition, the remote operator may be able to see the local operator in the volumetric capture space.

Figure 9:
FIG. 9 is a photograph of a local operator using the configuration system to view and interact with a target system through a mobile device.
Figure 10:
FIG. 10 is a screenshot of the remote operator's display view with the local operator also visible in the volumetric capture space.

FIG. 9 is a photograph of a local operator using the configuration system to view and interact with a target system through a mobile device. In this particular photograph the local operator is making changes to a limiter on an industrial machine. FIG. 10 is a screenshot of the remote operator's display view with the local operator also visible in the volumetric capture space.

Figure 11:
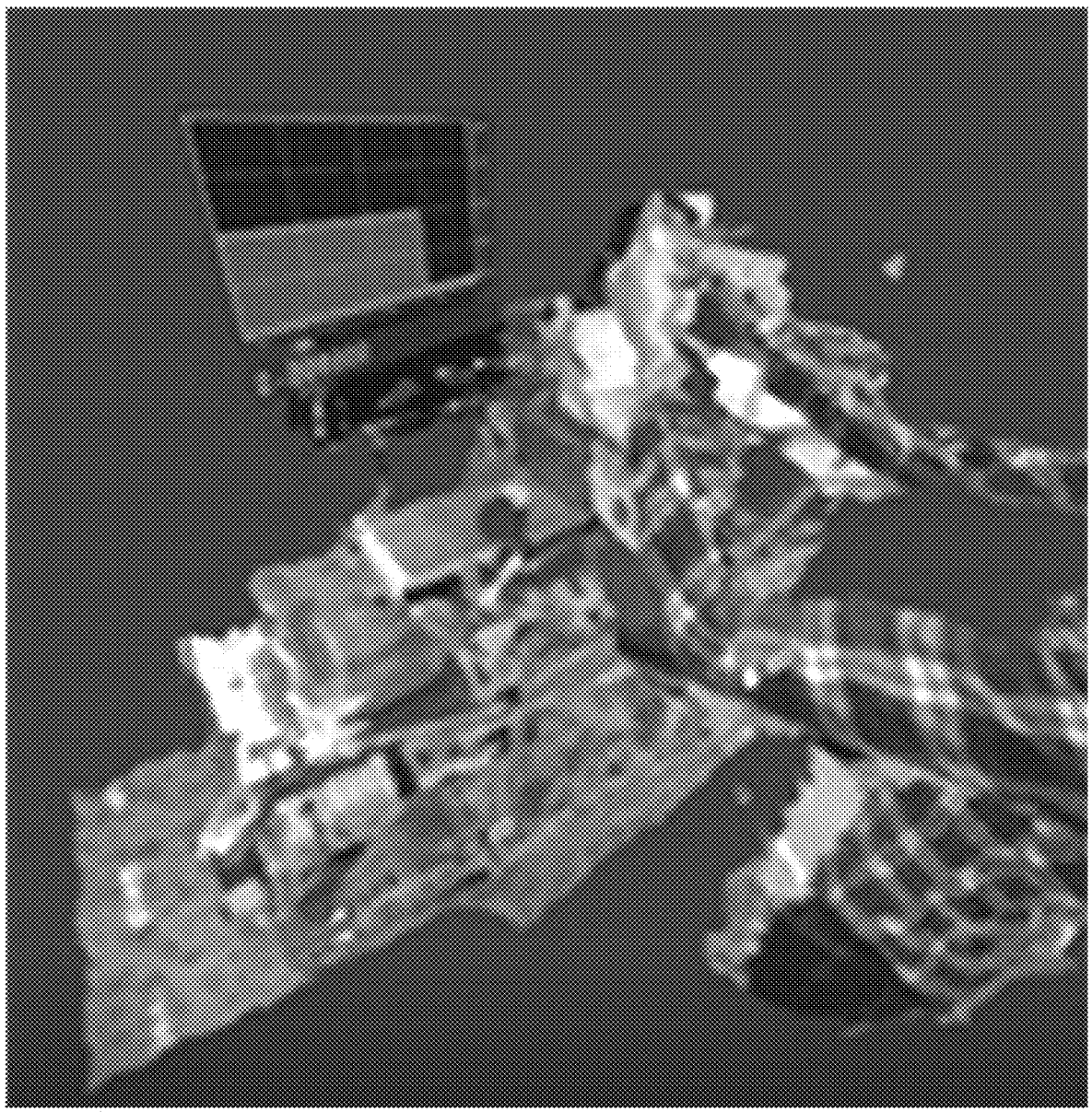
FIG. 11 is a screenshot of the remote operator's display view showing the local operator creating and manipulating a virtual graph using the Reality Editor operating on a mobile phone.

FIG. 11 is a screenshot of the remote operator's display view showing the local operator creating and manipulating a virtual graph using the Reality Editor operating on a mobile phone. The virtual graph can be created, configured and/or moved/located in virtual space using the Reality Editor, by either or both of the local user and the remote user. The virtual graph can be configured, for example, to display some sensor value or parameter of the target system. While the local operator can see and interact with the virtual graph using the Reality Editor on his mobile device, the remote user can also see and manipulate the same virtual graph remotely using the Reality Editor's interface as overlaid on the telepresence view.

Computer Implementation

Components of the embodiments disclosed herein, which may be referred to as methods, processes, applications, programs, modules, engines, functions or the like, can be implemented by configuring one or more computers or computer systems using special purpose software embodied as instructions on a non-transitory computer readable medium. The one or more computers or computer systems can be or include standalone, client and/or server computers, which can be optionally networked through wired and/or wireless networks as a networked computer system.

Figure 12:
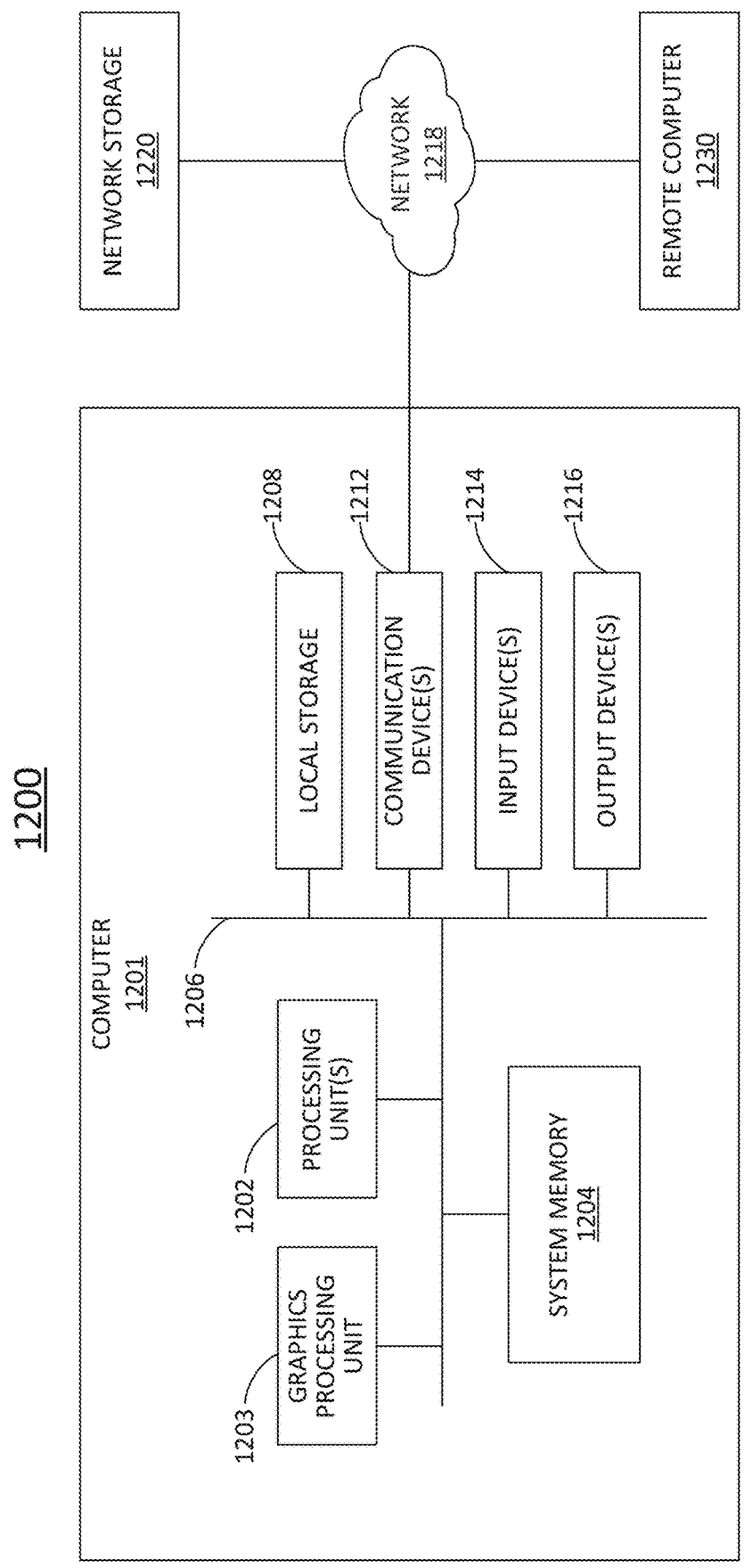
FIG. 12 illustrates a general computer architecture that can be appropriately configured to implement components disclosed in accordance with various embodiments.

FIG. 12 illustrates a general computer architecture 1200 that can be appropriately configured to implement components disclosed in accordance with various embodiments. The computing architecture 1200 can include various common computing elements, such as a computer 1201, a network 1218, and one or more remote computers 1230. The embodiments disclosed herein, however, are not limited to implementation by the general computing architecture 1200.

Referring to FIG. 12, the computer 1201 can be any of a variety of general purpose computers such as, for example, a server, a desktop computer, a laptop computer, a tablet computer or a mobile computing device. The computer 1201 can include a processing unit 1202, a system memory 1204 and a system bus 1206.

The processing unit 1202 can be any of various commercially available computer processors that can include one or more processing cores, which can operate independently of each other. Additional co-processing units, such as a graphics processing unit 1203, also can be present in the computer.

The system memory 1204 can include volatile devices, such as dynamic random access memory (DRAM) or other random access memory devices. The system memory 1204 can also or alternatively include non-volatile devices, such as a read-only memory or flash memory.

The computer 1201 can include local non-volatile secondary storage 1208 such as a disk drive, solid state disk, or removable memory card. The local storage 1208 can include one or more removable and/or non-removable storage units. The local storage 1208 can be used to store an operating system that initiates and manages various applications that execute on the computer. The local storage 1208 can also be used to store special purpose software configured to implement the components of the embodiments disclosed herein and that can be executed as one or more applications under the operating system.

The computer 1201 can also include communication device(s) 1212 through which the computer communicates with other devices, such as one or more remote computers 1230, over wired and/or wireless computer networks 1218. Communications device(s) 1212 can include, for example, a network interface for communicating data over a wired computer network. The communication device(s) 1212 can include, for example, one or more radio transmitters for communications over Wi-Fi, Bluetooth, and/or mobile telephone networks.

The computer 1201 can also access network storage 1220 through the computer network 1218. The network storage can include, for example, a network attached storage device located on a local network, or cloud-based storage hosted at one or more remote data centers. The operating system and/or special purpose software can alternatively be stored in the network storage 1220.

The computer 1201 can have various input device(s) 1214 such as a keyboard, mouse, touchscreen, camera, microphone, accelerometer, thermometer, magnetometer, or any other sensor. Output device(s) 1216 such as a display, speakers, printer, or eccentric rotating mass vibration motor can also be included.

The various storage 1208, communication device(s) 1212, output devices 1216 and input devices 1214 can be integrated within a housing of the computer, or can be connected through various input/output interface devices on the computer, in which case the reference numbers 1208, 1212, 1214 and 1216 can indicate either the interface for connection to a device or the device itself as the case may be.

Any of the foregoing aspects may be embodied in one or more instances as a computer system, as a process performed by such a computer system, as any individual component of such a computer system, or as an article of manufacture including computer storage in which computer program instructions are stored and which, when processed by one or more computers, configure the one or more computers to provide such a computer system or any individual component of such a computer system. A server, computer server, a host or a client device can each be embodied as a computer or a computer system. A computer system may be practiced in distributed computing environments where operations are performed by multiple computers that are linked through a communications network. In a distributed computing environment, computer programs can be located in both local and remote computer storage media.

Each component of a computer system such as described herein, and which operates on one or more computers, can be implemented using the one or more processing units of the computer and one or more computer programs processed by the one or more processing units. A computer program includes computer-executable instructions and/or computer-interpreted instructions, such as program modules, which instructions are processed by one or more processing units in the computer. Generally, such instructions define routines, programs, objects, components, data structures, and so on, that, when processed by a processing unit, instruct the processing unit to perform operations on data or configure the processor or computer to implement various components or data structures.

Components of the embodiments disclosed herein, which may be referred to as modules, engines, processes, functions or the like, can be implemented in hardware, such as by using special purpose hardware logic components, by configuring general purpose computing resources using special purpose software, or by a combination of special purpose hardware and configured general purpose computing resources. Illustrative types of hardware logic components that can be used include, for example, Field-programmable Gate Arrays (FPGAs), Application-specific Integrated Circuits (ASICs), Application-specific Standard Products (ASSPs), System-on-a-chip systems (SOCs), and Complex Programmable Logic Devices (CPLDs).

System Demonstration Video

Figure 13A:
FIGS. 13A-Q are screen captures of a demonstration video showing the configuration system being used by a remote operator and a local operator to interact with and configure an industrial electronically programmable machine during a session.
Figure 13B:
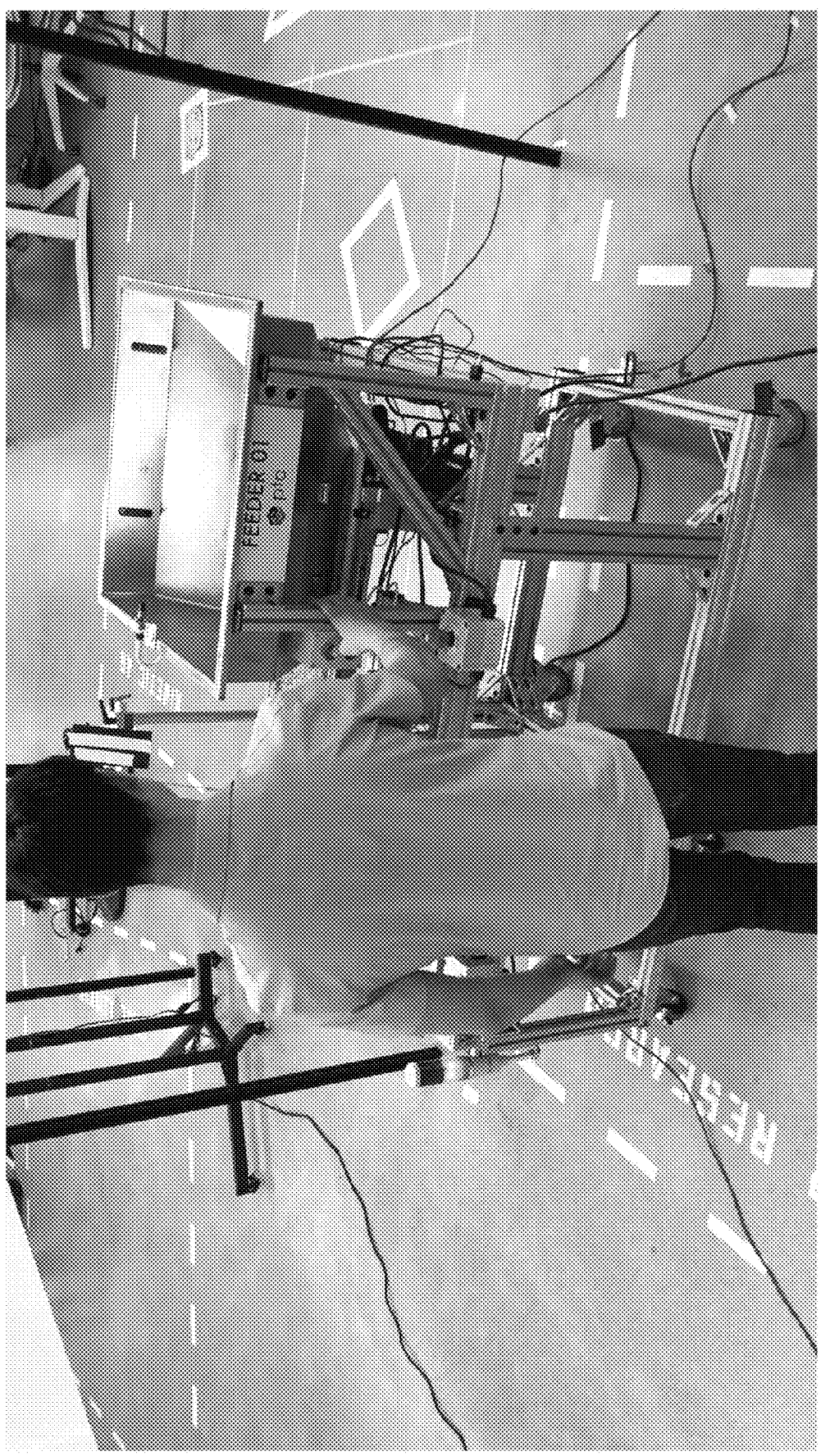
Figure 13C:
Figure 13D:
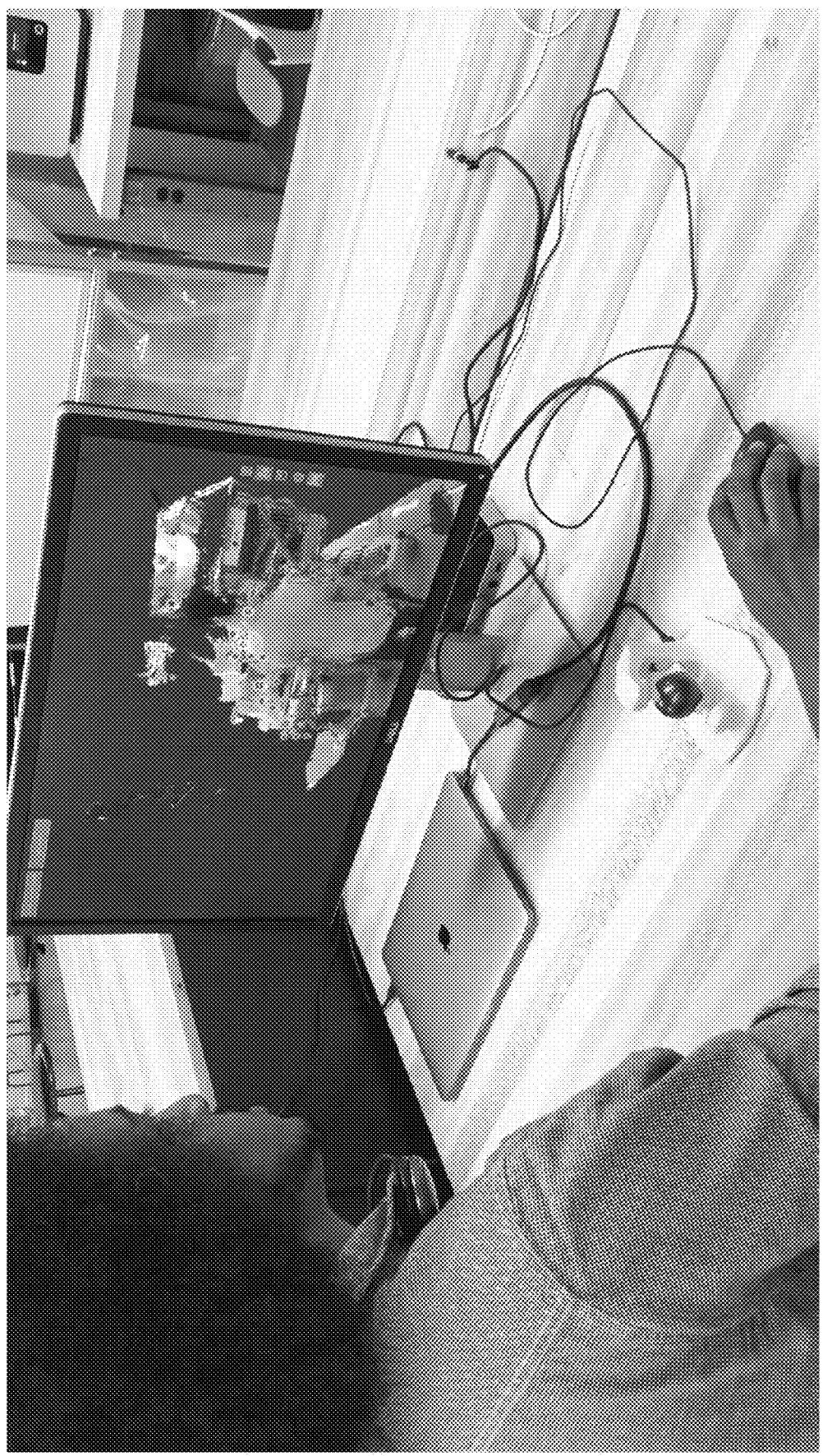
Figure 13E:
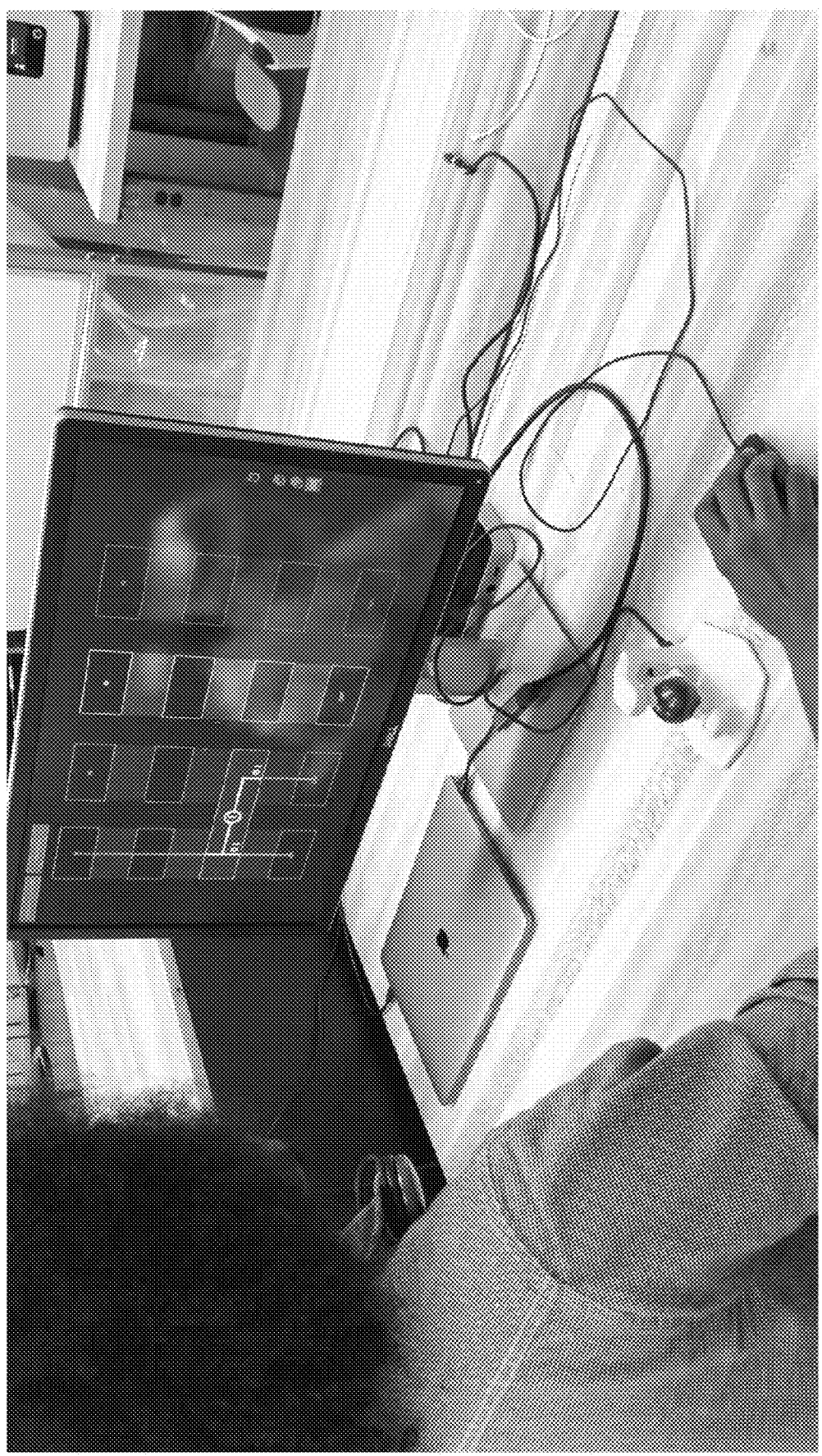
Figure 13F:
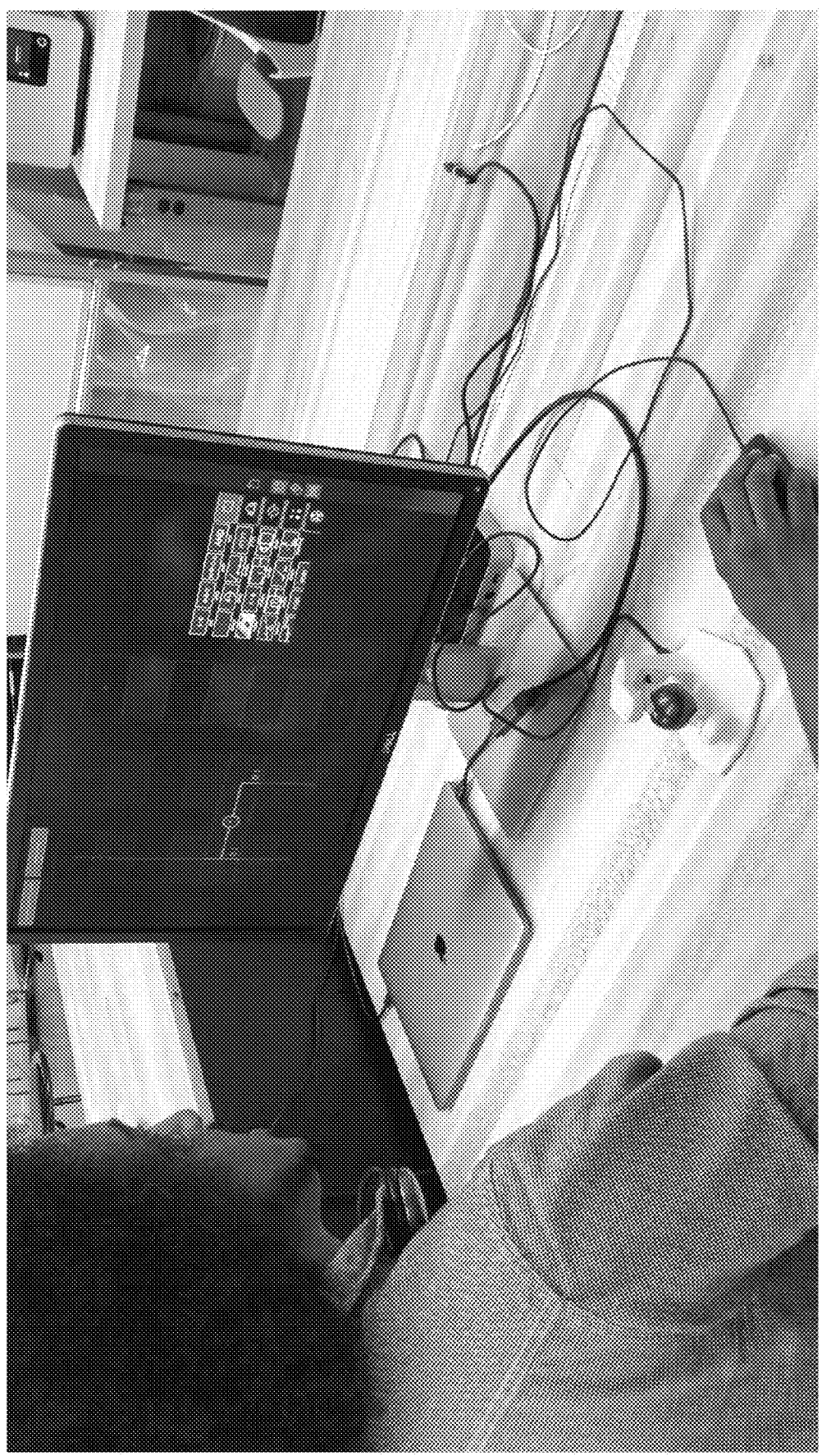
Figure 13G:
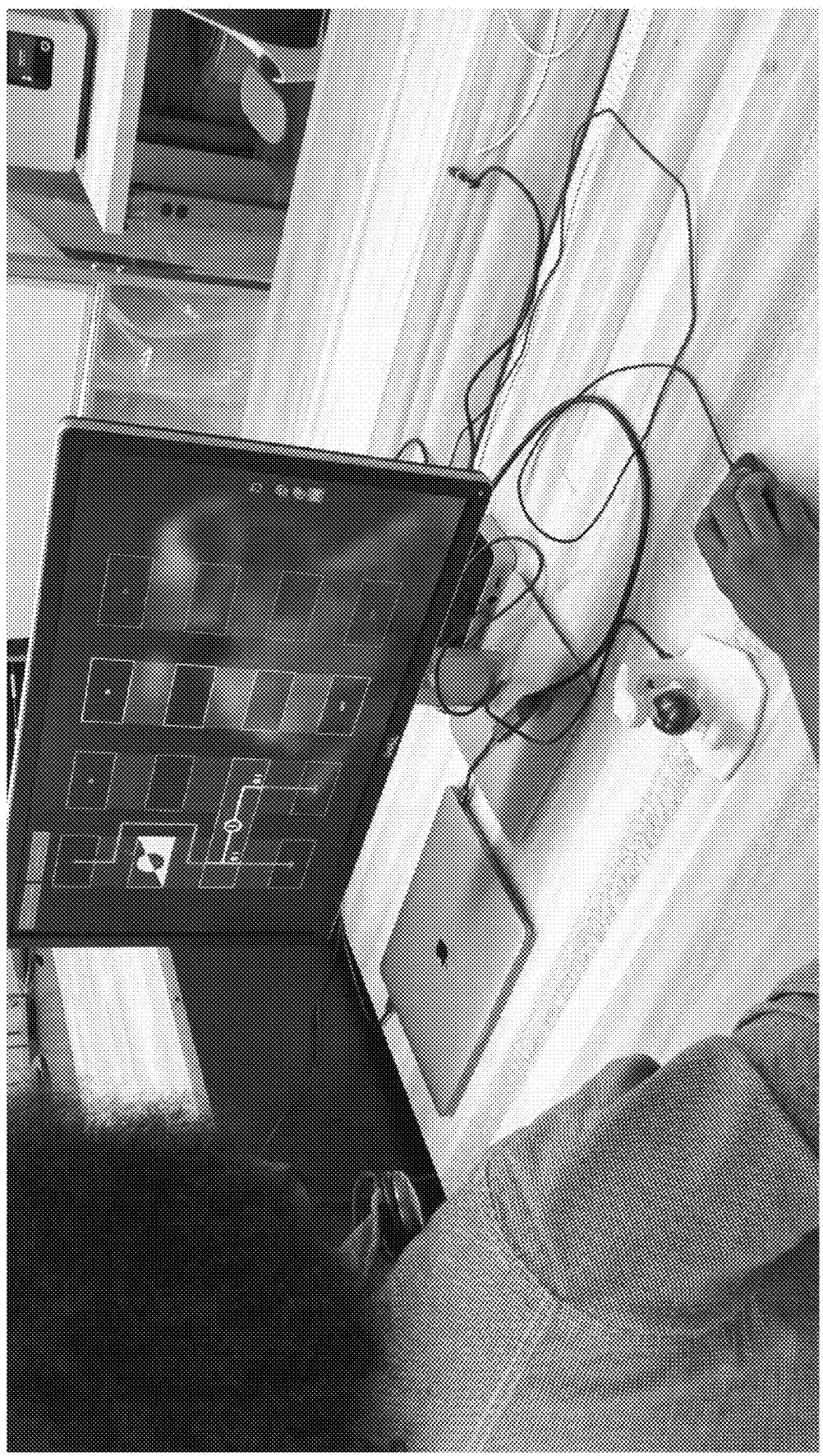
Figure 13H:
Figure 13I:
Figure 13J:
Figure 13K:
Figure 13L:
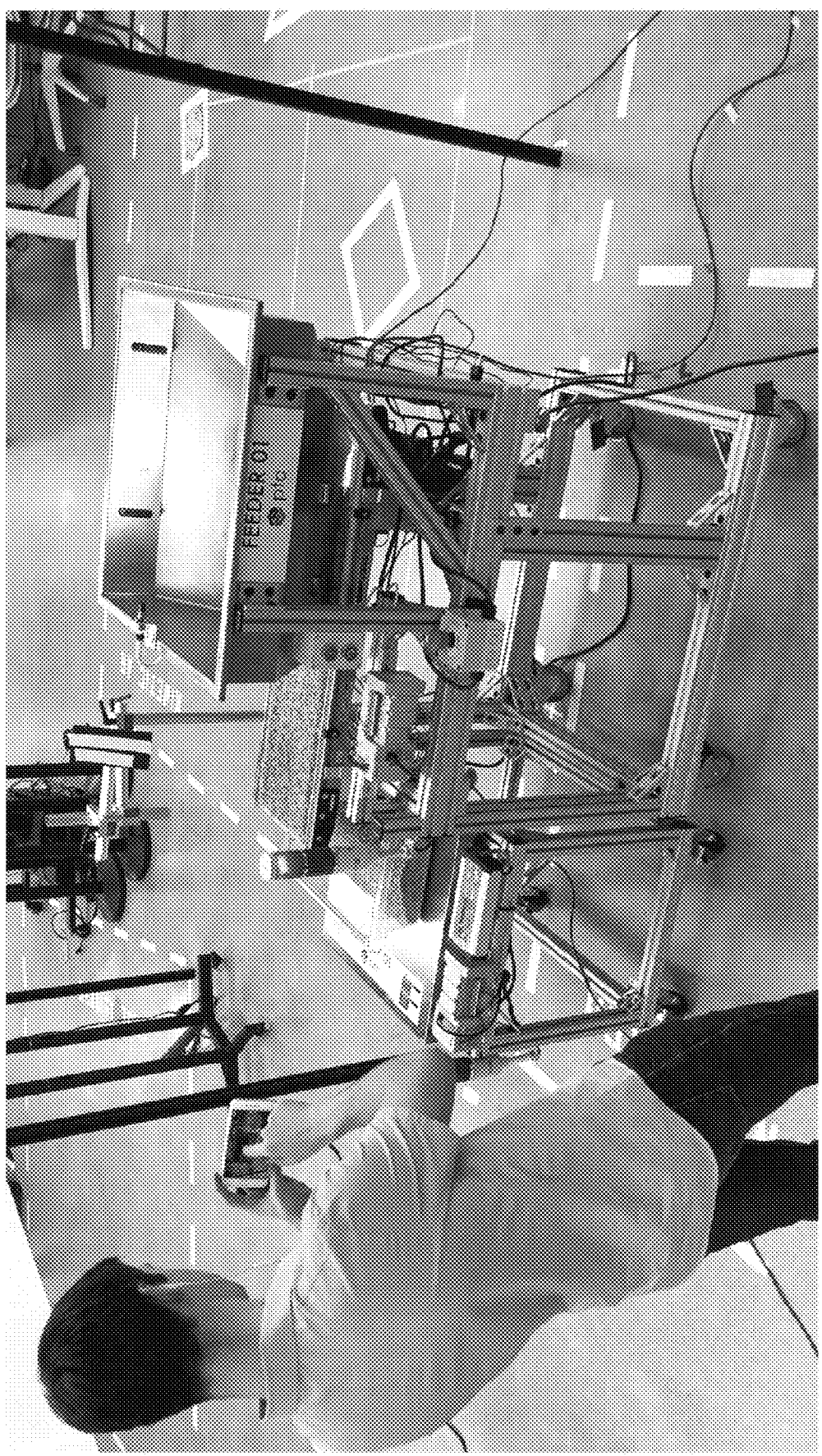
Figure 13M:
Figure 13N:
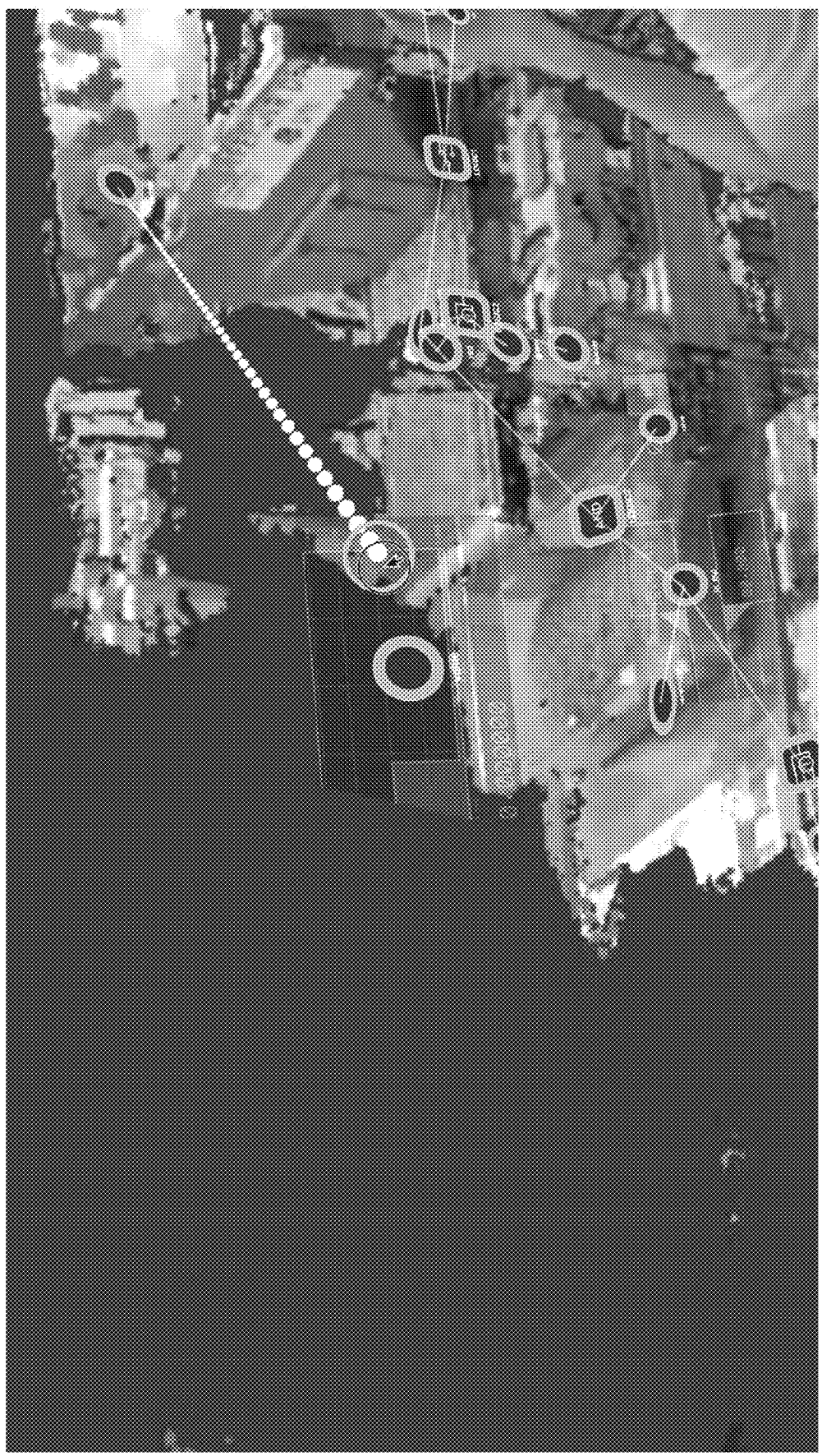
Figure 13O:
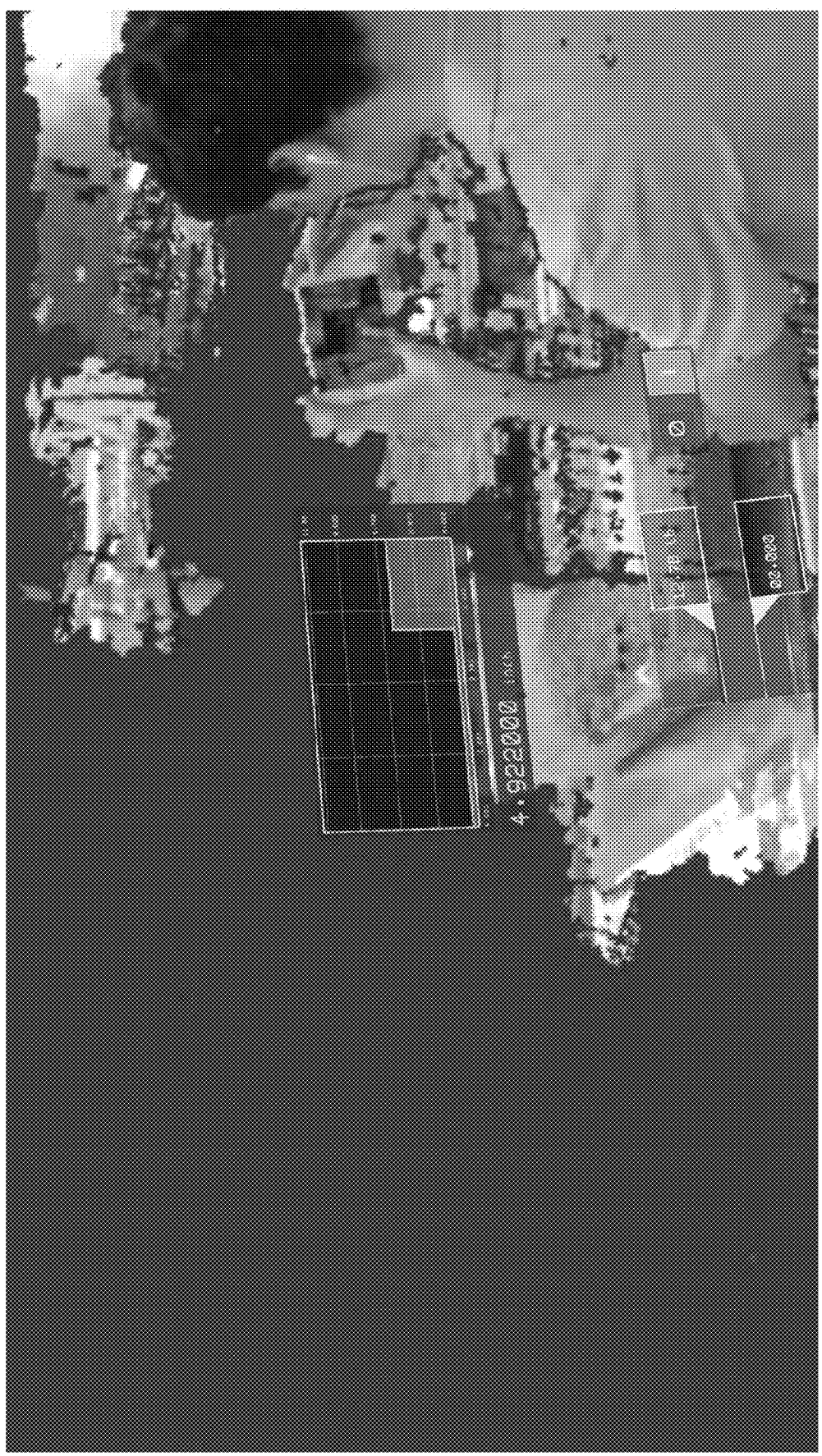
Figure 13P:
Figure 13Q:
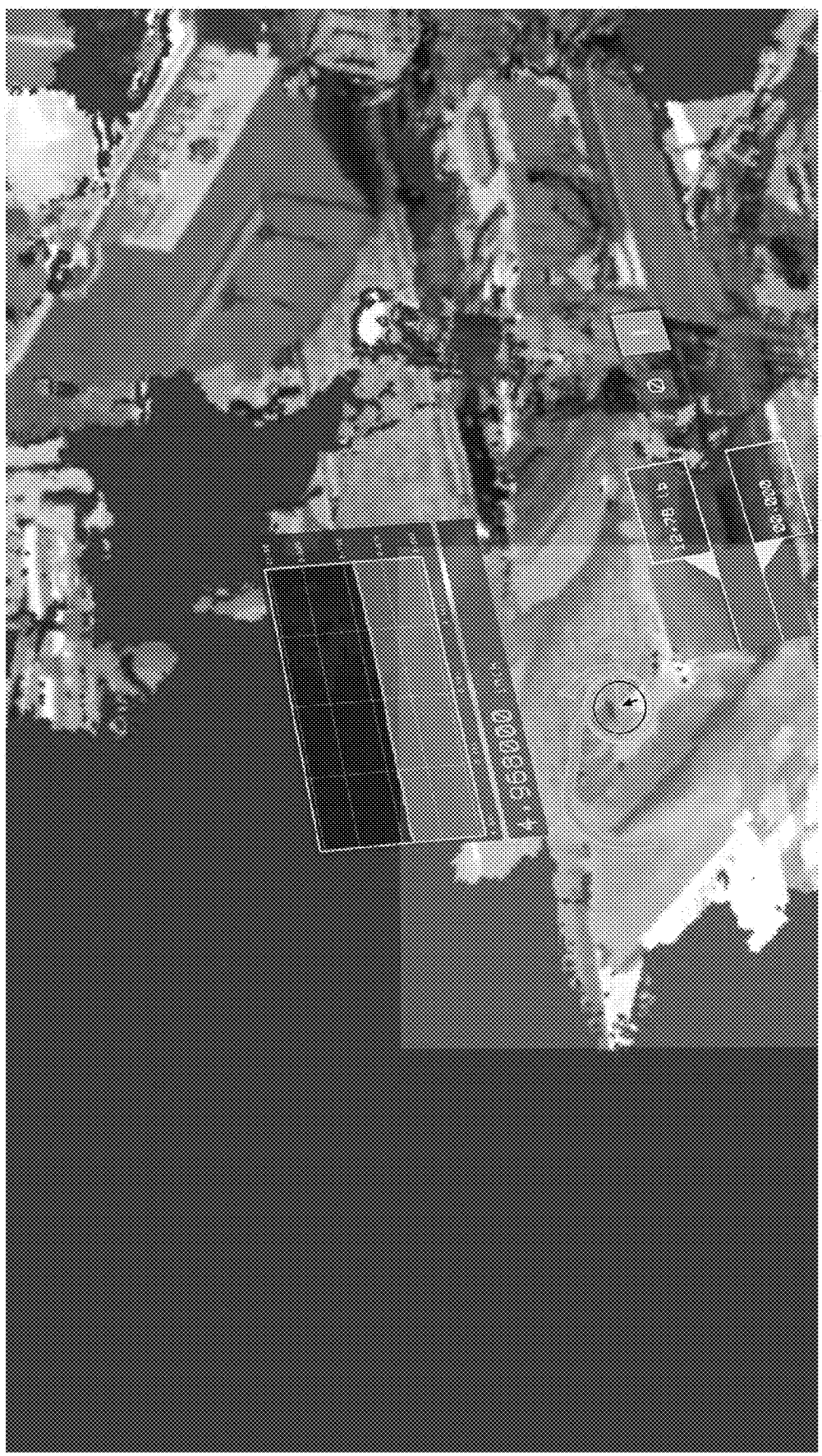

FIGS. 13A-Q are screen captures of a demonstration video showing the configuration system being used by a remote operator and a local operator to interact with and configure an industrial electronically programmable machine during a session. Each Figure is referenced below along with associated conversation exchanged between the operators during the session.

FIG. 13A is a view of the remote operator using the remote user interface of the configuration system to view the local operator standing adjacent the machine.

FIG. 13B is a local camera view of the local operator in the process of operating the machine using a physical switch located on the machine.

FIG. 13C is a zoomed in view of the remote user interface showing that a red indicator light on the machine that is associated with a control labelled "red" in the Reality Editor interface has turned on when the local operator has started the machine.

FIG. 13D is a view, after the machine has been stopped, of the remote operator using the remote user interface of the configuration system to select the "LOGIC2" node (shown encircled) in the Reality Editor, which is connected to the red indicator light and a green indicator light.

FIG. 13E is a view of the remote user interface showing logic associated with the selected node.

FIG. 13F is a view of the remote user interface showing the remote user selecting an inverter logic block.

FIG. 13G is a view of the remote user interface showing the remote user having placed the inverter logic block in the logic representation of the node.

FIG. 13H is a view of the remote user interface showing the remote user having connected the inverter logic block inline the logic representation of the node.

FIG. 13I is a zoomed in view of the remote user interface showing that, with the reconfigured logic, the green indicator light on the machine now operates when the machine has been started.

FIG. 13J is a zoomed in view of the remote user interface showing that, with the reconfigured logic, the red indicator light on the machine now operates when the machine has been stopped.

FIG. 13K is a zoomed in view of the remote user interface showing the local operator using a the Reality Editor on a mobile phone to select and place a virtual graph object above a portion of the machine. The virtual graph object will now appear in both the augmented reality interface of the mobile phone as well as on the remote user interface.

FIG. 13L is a local camera view of the local operator placing the virtual graph object.

FIG. 13M is a view of the remote user using the interface to view the local user placing the virtual graph object.

FIG. 13N is a zoomed in view of the remote user interface showing the remote operator connecting a sensor node associated with a fill level in a bin to the graph object.

FIG. 13O shows the graph object indicating the value of the sensor, which is indicating a fill level in a hopper.

FIG. 13P shows a view of the remote user using the remote user interface to draw on a virtual whiteboard position that he has positioned in virtual space.

FIG. 13Q shows a zoomed in view of the remote user using the remote user interface to draw on a virtual whiteboard position that he has positioned in virtual space. The local user can simultaneously see the same virtual whiteboard with the drawing in augmented reality through his mobile device.

Additional Aspects

A method can be performed by one or more computers, each computer having at least one processor and a memory. The method can include: receiving a stream of live image data from each of a plurality of cameras capturing images of a portion of a physical environment containing an electronically configurable target system; processing the streams of live image data to create a live 3D model of the environment; providing a remote user interface through which a remote user can view a visual perspective of the live 3D model, wherein the remote user can freely navigate a six dimensional pose of the visual perspective about the live 3D model; augmenting the remote user interface with a configuration user interface for configuring the electronically configurable target system, wherein the configuration user interface is visually depicted in a constant location relative to an aspect of the environment as the visual perspective of the remote user interface changes; providing a local user interface on a display of a local user device equipped with a local user device camera, wherein a local user positioned within the physical environment can view a live visual perspective of the environment through the display; augmenting the local user interface with the configuration user interface for configuring the electronically configurable target system, wherein the configuration user interface is visually depicted in a constant location relative to the aspect of the environment as the live visual perspective of the environment changes with movement of the local user device; receiving user input to configure the electronically configurable target system through the configuration user interface by way of one of the remote user interface and the local user interface; and in response to receiving the user input, providing visual feedback through the configuration user interface by way of both the remote user interface and the local user interface.

The aspect of the environment can be a stationary coordinate system fixed relative to the environment. The aspect of the environment can be an object that is moveable about the environment. The object can be a portion of the configurable target system.

The user input to configure the electronically configurable target system can include an instruction to modify an operational property of the configurable target system.

The method can further include receiving visual programming input through one of the remote user interface and the local user interface for visually programming the configurable target system, wherein the visual programming input includes the user input to configure the electronically configurable target system.

The visually programming the configurable target system can include configuring the configurable target system to display a display element in the configuration user interface, wherein the display element visualizes dynamically updated information of the configurable target system. The display element can be selected from the group consisting of: a graph, a numerical value display, an image, a downloadable file, and a document.

The visually programming the configurable target system can include configuring the configurable target system to display a control element in the configuration user interface, wherein the control element operates to receive user input that affects control of the configurable target system. The control element can be selected from the group consisting of: a switch, a numerical input, a file upload input, a data upload input, and a text input.

The electronically configurable target system can be an industrial machine, an industrial system, a residential home automation system, or a commercial building automation system.

Each of the plurality of cameras can be a depth camera configured to measure and record distances of physical surfaces from the depth camera for pixels representing physical surfaces in the images.

The local user device can be configured to implement augmented reality features, wherein the live view of the environment displayed through the display of the local user device is provided by the local user device camera, and wherein the configuration user interface for configuring the electronically configurable target system is displayed as an augmented reality feature on the display.

The display of the local user device can be a transparent display configured to display mixed reality features, wherein the live view of the environment displayed through the display of the local user device is an actual view of the environment viewed through the transparent display, and wherein the configuration user interface for configuring the electronically configurable target system is displayed as a mixed reality feature on the transparent display.

A system can include the one or more computers of any one of the above-recited methods, wherein the one or more computers are configured to: perform a first portion of the method, and cause one or more other computers to perform a second portion of the method, such that the method is performed jointly by the one or more computers and the one or more other computers.

One or more non-transitory computer-readable media can be encoded with computer code that, when executed by the one or more computers of any one of the above-recited methods, cause the one or more computers to perform the method.

A method can be performed by one or more computers, each computer having at least one processor and a memory. The method can include: receiving a stream of live image data from each of a plurality of cameras capturing images of a portion of a physical environment containing an electronically configurable target system; processing the streams of live image data to create a live 3D model of the environment; providing a remote user interface through which a remote user can view a visual perspective of the live 3D model, wherein the remote user can freely navigate a six dimensional pose of the visual perspective about the live 3D model; augmenting the remote user interface with a configuration user interface for configuring the electronically configurable target system, wherein the configuration user interface is visually depicted in a constant location relative to an aspect of the environment as the visual perspective of the remote user interface changes; providing a local user interface on a display of a local user device equipped with a local user device camera, through which local user interface a local user positioned within the physical environment can view a live view of the environment captured by the local user device camera; augmenting the local user interface with the configuration user interface for configuring the electronically configurable target system, wherein the configuration user interface is visually depicted in a constant location relative to an aspect of the environment as a perspective of the live view of the environment captured by the local user device camera changes; receiving user input to configure the electronically configurable target system through the configuration user interface by way of one of the remote user interface and the local user interface; and in response to receiving the user input, providing visual feedback through the configuration user interface by way of both the remote user interface and the local user interface.

CONCLUSION

Although the subject matter has been described in terms of certain embodiments, other embodiments that may or may not provide various features and aspects set forth herein shall be understood to be contemplated by this disclosure. The specific embodiments described above are disclosed as examples only, and the scope of the patented subject matter is defined by the claims that follow. In the claims, the term "based upon" shall include situations in which a factor is taken into account directly and/or indirectly, and possibly in conjunction with other factors, in producing a result or effect. In the claims, a portion shall include greater than none and up to the whole of a thing; encryption of a thing shall include encryption of a portion of the thing. In method claims, any reference characters are used for convenience of description only, and do not indicate a particular order for performing a method.

The invention claimed is:

1. A method performed by one or more computers, each computer having at least one processor and a memory, the method comprising:
    receiving a stream of live image data from each of a plurality of cameras capturing images of a portion of a physical environment containing an electronically configurable target system;
    processing the streams of live image data to create a live 3D model of the environment;

providing a remote user interface through which a remote user can view a visual perspective of the live 3D model, wherein the remote user can freely navigate a six dimensional pose of the visual perspective about the live 3D model;

augmenting the remote user interface with a configuration user interface for configuring the electronically configurable target system, wherein the configuration user interface is visually depicted in a constant location relative to an aspect of the environment as the visual perspective of the remote user interface changes;

providing a local user interface on a display of a local user device equipped with a local user device camera, wherein a local user positioned within the physical environment can view a live visual perspective of the environment through the display;

augmenting the local user interface with the configuration user interface for configuring the electronically configurable target system, wherein the configuration user interface is visually depicted in a constant location relative to the aspect of the environment as the live visual perspective of the environment changes with movement of the local user device;

receiving user input to configure the electronically configurable target system through the configuration user interface by way of one of the remote user interface and the local user interface; and in response to receiving the user input, providing visual feedback through the configuration user interface by way of both the remote user interface and the local user interface.

2. The method of claim 1, wherein the aspect of the environment is a stationary coordinate system fixed relative to the environment.

3. The method of claim 1, wherein the aspect of the environment is an object that is moveable about the environment.

4. The method of claim 3, wherein the object is a portion of the configurable target system.

5. The method of claim 1, wherein the user input to configure the electronically configurable target system comprises an instruction to modify an operational property of the configurable target system.

6. The method of claim 1, further comprising receiving visual programming input through one of the remote user interface and the local user interface for visually programming the configurable target system, wherein the visual programming input comprises the user input to configure the electronically configurable target system.

7. The method of claim 6, wherein the visually programming the configurable target system comprises configuring the configurable target system to display a display element in the configuration user interface, wherein the display element visualizes dynamically updated information of the configurable target system.

8. The method of claim 7, wherein the display element is selected from the group consisting of: a graph, a numerical value display, an image, a downloadable file, and a document.

9. The method of claim 6, wherein the visually programming the configurable target system comprises configuring the configurable target system to display a control element in the configuration user interface, wherein the control element operates to receive user input that affects control of the configurable target system.

10. The method of claim 9, wherein the control element is selected from the group consisting of: a switch, a numerical input, a file upload input, a data upload input, and a text input.

11. The method of claim 1, wherein the electronically configurable target system is an industrial machine.

12. The method of claim 1, wherein the electronically configurable target system is an industrial system.

13. The method of claim 1, wherein the electronically configurable target system is a residential home automation system.

14. The method of claim 1, wherein the electronically configurable target system is a commercial building automation system.

15. The method of claim 1, wherein each of the plurality of cameras is a depth camera configured to measure and record distances of physical surfaces from the depth camera for pixels representing physical surfaces in the images.

16. The method of claim 1, wherein the local user device is configured to implement augmented reality features, wherein the live view of the environment displayed through the display of the local user device is provided by the local user device camera, and wherein the configuration user interface for configuring the electronically configurable target system is displayed as an augmented reality feature on the display.

17. The method of claim 1, wherein the display of the local user device is a transparent display configured to display mixed reality features, wherein the live view of the environment displayed through the display of the local user device is an actual view of the environment viewed through the transparent display, and wherein the configuration user interface for configuring the electronically configurable target system is displayed as a mixed reality feature on the transparent display.

18. A system comprising the one or more computers of the method of claim 1, wherein the one or more computers:
perform a first portion of the method, and
cause one or more other computers to perform a second portion of the method,
such that the method is performed jointly by the one or more computers and the one or more other computers.

19. One or more non-transitory computer-readable media encoded with computer code that is executed by the one or more computers of the method of claim 1, to cause the one or more computers to perform the method.

20. A method performed by one or more computers, each computer having at least one processor and a memory, the method comprising:
receiving a stream of live image data from each of a plurality of cameras capturing images of a portion of a physical environment containing an electronically configurable target system;
processing the streams of live image data to create a live 3D model of the environment;
providing a remote user interface through which a remote user can view a visual perspective of the live 3D model, wherein the remote user can freely navigate a six dimensional pose of the visual perspective about the live 3D model;
augmenting the remote user interface with a configuration user interface for configuring the electronically configurable target system, wherein the configuration user interface is visually depicted in a constant location relative to an aspect of the environment as the visual perspective of the remote user interface changes;

providing a local user interface on a display of a local user device equipped with a local user device camera, through which local user interface a local user positioned within the physical environment can view a live view of the environment captured by the local user device camera;

augmenting the local user interface with the configuration user interface for configuring the electronically configurable target system, wherein the configuration user interface is visually depicted in a constant location relative to an aspect of the environment as a perspective of the live view of the environment captured by the local user device camera changes;

receiving user input to configure the electronically configurable target system through the configuration user interface by way of one of the remote user interface and the local user interface; and in response to receiving the user input, providing visual feedback through the configuration user interface by way of both the remote user interface and the local user interface.

* * * * *